(12) United States Patent
Winter et al.

(10) Patent No.: US 8,241,404 B2
(45) Date of Patent: Aug. 14, 2012

(54) METHODS OF RECYCLING CARBON DIOXIDE TO THE GASIFICATION SYSTEM

(75) Inventors: John Duckett Winter, Broomfield, CO (US); Paul Steven Wallace, Katy, TX (US); George Gulko, Houston, TX (US); Pradeep S. Thacker, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 12/486,228

(22) Filed: Jun. 17, 2009

(65) Prior Publication Data

US 2010/0324156 A1 Dec. 23, 2010

(51) Int. Cl.
*B01D 53/14* (2006.01)

(52) U.S. Cl. .............. 95/204; 95/227; 95/236; 48/211; 48/212; 48/213; 48/214 R; 48/127.1

(58) Field of Classification Search .............. None
See application file for complete search history.

(56) References Cited

U.S. PATENT DOCUMENTS

| | | | |
|---|---|---|---|
| 3,531,917 A | | 10/1970 | Grunewald et al. |
| 3,710,546 A | * | 1/1973 | Grunewald et al. ............. 95/174 |
| 4,254,094 A | | 3/1981 | Hegarty |
| 4,384,875 A | | 5/1983 | Batteux et al. |
| 4,568,364 A | | 2/1986 | Galstaun et al. |
| 5,137,550 A | | 8/1992 | Hegarty et al. |
| 5,232,467 A | | 8/1993 | Child et al. |
| 5,240,476 A | | 8/1993 | Hegarty |
| 5,345,756 A | | 9/1994 | Jahnke et al. |
| 6,090,356 A | | 7/2000 | Jahnke et al. |
| 6,416,568 B1 | | 7/2002 | Wallace et al. |
| 6,551,380 B1 | | 4/2003 | Reddy et al. |
| 6,998,098 B2 | | 2/2006 | Allison |
| 7,056,487 B2 | | 6/2006 | Newby |
| 7,604,684 B2 | | 10/2009 | Menzel |
| 7,637,984 B2 | | 12/2009 | Adamopoulos |
| 7,708,801 B2 | | 5/2010 | Thacker et al. |
| 7,846,226 B2 | | 12/2010 | Leininger et al. |

(Continued)

FOREIGN PATENT DOCUMENTS

CA 2219112 A1 4/1998

(Continued)

OTHER PUBLICATIONS

Poland Search Report issued in connection with corresponding Poland Application No. P-391549 on Jul. 7, 2010.
Polish Search Report for corresponding Polish Application No. P-391591, dated Jun. 25, 2010.

*Primary Examiner* — Duane Smith
*Assistant Examiner* — Pankti Patel
(74) *Attorney, Agent, or Firm* — Armstrong Teasdale LLP

(57) ABSTRACT

Method of producing syngas in an IGCC system, comprising compressing and heating carbon dioxide-rich gas to produce heated compressed carbon dioxide-rich gas, mixing the heated compressed carbon dioxide-rich gas with oxygen and feedstock to form a feedstock mixture, subjecting the feedstock mixture to gasification to produce syngas, cooling the syngas in a radiant syngas cooler, contacting syngas cooled in the radiant syngas cooler with compressed carbon dioxide-rich gas to further cool the syngas, and removing an amount of carbon dioxide-rich gas from the product mixture and compressing the removed carbon dioxide-rich gas prior to mixing with oxygen and feedstock.

10 Claims, 2 Drawing Sheets

U.S. PATENT DOCUMENTS

| | | | |
|---|---|---|---|
| 2007/0137103 A1* | 6/2007 | Wallace | 48/111 |
| 2007/0256361 A1 | 11/2007 | Kindig | |
| 2007/0289214 A1 | 12/2007 | Briesch et al. | |
| 2008/0028765 A1 | 2/2008 | Bartlett | |
| 2008/0098654 A1* | 5/2008 | Cherry et al. | 48/101 |
| 2008/0127831 A1 | 6/2008 | Rochelle et al. | |
| 2008/0223214 A1 | 9/2008 | Palamara et al. | |
| 2009/0178338 A1* | 7/2009 | Leininger et al. | 48/86 R |
| 2009/0324458 A1* | 12/2009 | Robinson et al. | 422/187 |
| 2011/0000133 A1* | 1/2011 | Rhinesmith et al. | 48/127.1 |

FOREIGN PATENT DOCUMENTS

| | | |
|---|---|---|
| GB | 848528 | 9/1960 |
| PL | 155387 B1 | 11/1991 |
| PL | 328100 A1 | 2/2000 |
| PL | 187700 B1 | 9/2004 |
| PL | 200229 B1 | 12/2008 |
| WO | 2010002469 A1 | 1/2010 |

* cited by examiner

METHODS OF RECYCLING CARBON DIOXIDE TO THE GASIFICATION SYSTEM

The present invention relates generally to improvements in operations of an integrated gasification combined cycle plant, and more specifically to methods of recycling supplied carbon dioxide-rich gas from syngas to a gasifier and/or a radiant syngas cooler inlet after heating.

BACKGROUND OF THE INVENTION

In at least some known integrated gasification combined cycle systems (IGCC), carbon dioxide (and, more generally, carbon dioxide-rich gas) removed from syngas is vented or is used for the production of chemicals, and is typically not recycled to the gasifier (also referred to herein as gasification reactor). In those systems wherein carbon dioxide-rich gas has been recycled back to the gasifier (i.e., in some gaseous feedstock plants and a few liquid feedstock plants), the recycling has been performed to increase the carbon monoxide to hydrogen ratio in the syngas for processes generating oxochemicals. However, in such processes, no benefits have been achieved with regard to reduced oxygen consumption or improved carbon conversion with a gaseous feedstock.

A need exists for improving IGCC efficiency with respect to processing of carbon dioxide-rich gas in an IGCC plant. Specifically, a need exists for a gasification method that has a reduced oxygen and/or hydrogen consumption, and that has an increased carbon conversion. Additionally, it would be advantageous if cooling methods could be provided that required a lower heating value as compared to conventional methods, thereby providing for a more cost-efficient and economical alternative.

BRIEF DESCRIPTION OF THE INVENTION

It has now been discovered, surprisingly, that by recycling carbon dioxide-rich gas to a gasifier in gasifying systems such as used in an IGCC plant, the oxygen from the carbon dioxide-rich gas participates in the gasification reactions, and facilitates reducing oxygen consumption and increasing carbon conversion. Both reduced oxygen consumption and higher carbon conversion facilitate increased IGCC plant efficiency. Mixing carbon dioxide-rich gas with hot syngas at the inlet of a radiant syngas cooler as described herein, favorably alters the reverse water gas shift reaction, such that the carbon dioxide reacts endothermically with hydrogen in the syngas to facilitate producing more carbon monoxide. Increased carbon monoxide facilitates reduced hydrogen consumption, and increased IGCC efficiency.

In a first aspect, a method of recycling from a first syngas mixture of a gasification system is provided. The method includes removing carbon dioxide-rich gas from the first syngas mixture in a separation device; compressing the carbon dioxide-rich gas; and feeding at least a first portion of the compressed carbon dioxide-rich gas to a gasifier.

In another aspect, a method of recycling carbon dioxide from a first syngas mixture of a gasification system is provided. The method includes removing carbon dioxide-rich gas from the first syngas mixture in a separation device; compressing the carbon dioxide-rich gas; producing a second syngas mixture in a gasifier; mixing the second syngas mixture and at least a first portion of the compressed carbon dioxide-rich gas to form a combined syngas mixture; and introducing the combined syngas mixture into a radiant syngas cooler to facilitate cooling the second syngas mixture.

In a further aspect, a method of recycling carbon dioxide from a first syngas mixture of a gasification system is provided. The method includes removing carbon dioxide-rich gas from the first syngas mixture in a separation device; compressing the carbon dioxide-rich gas; producing a second syngas mixture in a gasifier; mixing the second syngas mixture and at least a first portion of the compressed carbon dioxide-rich gas to form a combined syngas mixture and introducing the combined syngas mixture into a convective syngas cooler to facilitate cooling the second syngas mixture.

DETAILED DESCRIPTION OF THE INVENTION

Figure 1:
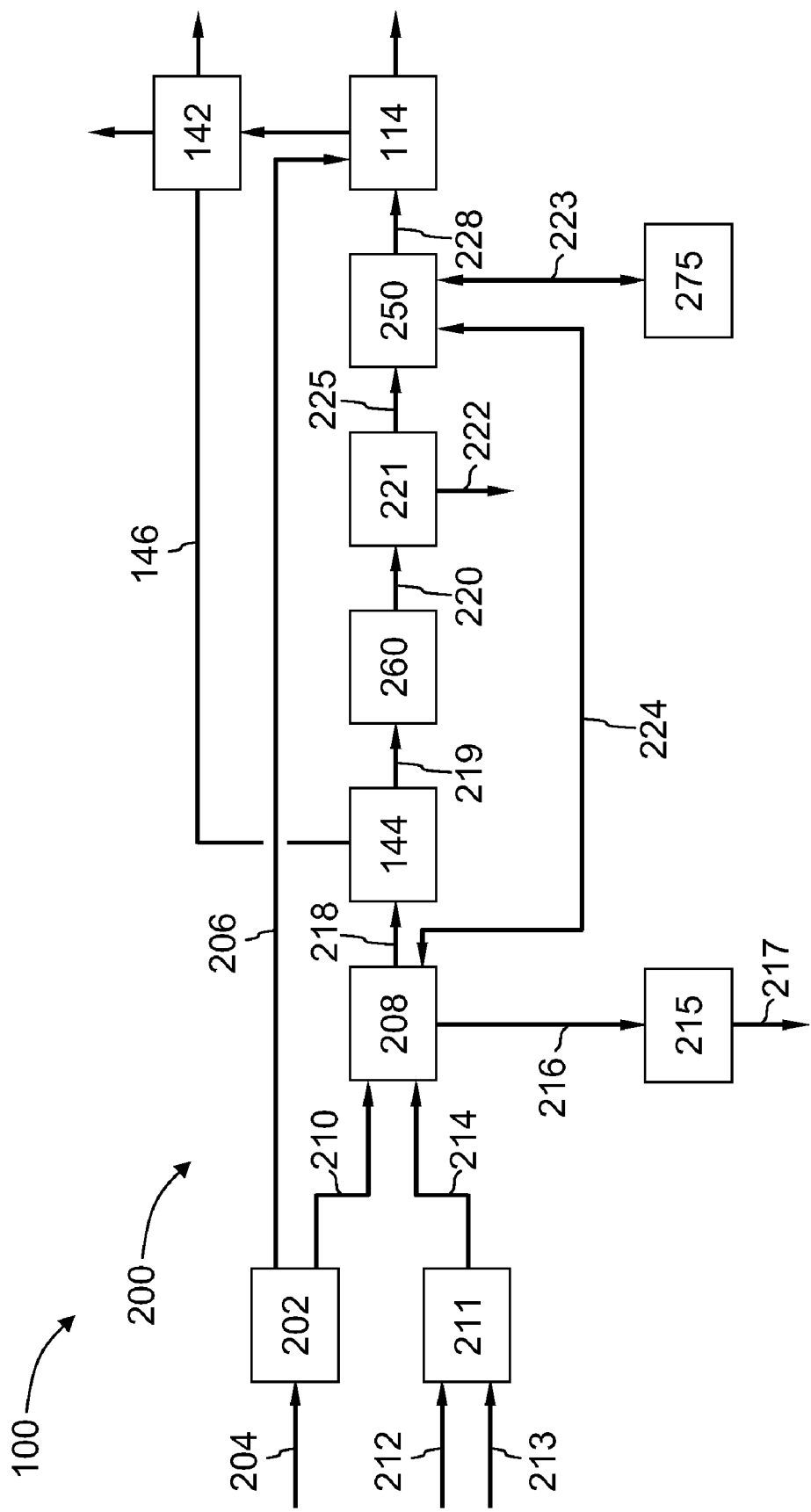
FIG. 1 is a schematic diagram of an exemplary integrated gasification combined-cycle (IGCC) power generation plant.
Figure 2:
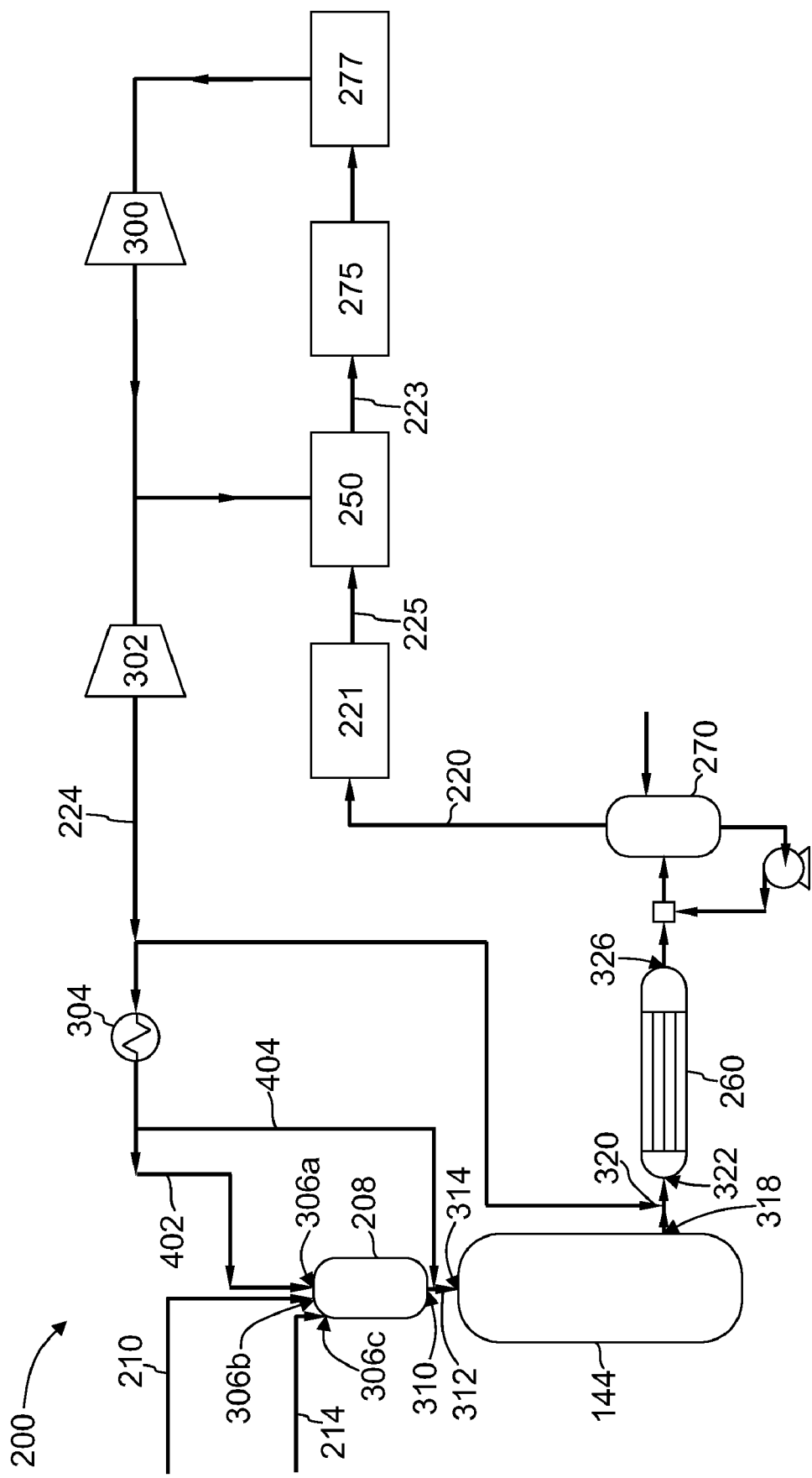
FIG. 2 is a schematic drawing that illustrates exemplary processes of the invention wherein carbon dioxide-rich gas, from the syngas in the separation unit, is recycled to one of the gasifier, radiant syngas cooler, and convective syngas cooler.

FIG. 1 is a schematic diagram of an exemplary integrated gasification combined-cycle (IGCC) power generation plant 100. FIG. 2 is a schematic diagram illustrating exemplary processes of the invention. While FIG. 1 depicts only a portion of IGCC plant 100, it should be understood by one skilled in the art that the methods as described herein can be used in a complete IGCC plant (including at least one steam turbine engine and an electrical generator) and/or in structurally similar IGCC plants as known in the art.

Furthermore, it should be understood by one skilled in the art that while described herein with an IGCC power generation plant, the present invention can be used with any known separation and/or gasification system without departing from the scope of the present invention. More particularly, systems including separation devices for providing physical and/or chemical separation, pressure-swing adsorption, temperature-swing adsorption, membrane separation, and the like, and combinations thereof can suitably be used with the methods of the present invention.

In the exemplary embodiment, IGCC plant 100 includes gasification system 200. Moreover, in the exemplary embodiment, system 200 includes at least one air separation unit 202 that is coupled in flow communication with an air source (not shown) via an air conduit 204. Such air sources may include, but are not limited to, dedicated air compressors and/or compressed air storage units (neither shown). Unit 202 separates air into oxygen ($O_2$), nitrogen ($N_2$), and other components are released via a vent (not shown).

System 200 includes a gasifier 208 that is coupled in flow communication with unit 202 and that receives the $O_2$ channeled from unit 202 via an $O_2$ conduit 210. System 200 also includes a coal grinding and slurrying unit 211. Unit 211 is coupled in flow communication with a coal source and a water source (neither shown) via a coal supply conduit 212 and a water supply conduit 213, respectively. Unit 211 is configured to mix the coal and water to form a coal slurry reactant stream, referred to hereinafter as "feedstock" (not shown) that is channeled to gasifier 208 via a coal slurry conduit 214.

Gasifier 208 receives the feedstock and $O_2$ via conduits 214 and 210, respectively. Gasifier 208 facilitates the production of a hot, raw synthetic gas (syngas) stream (not shown). The raw syngas includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, from hereon, $CO_2$ will be discussed separately from the remaining acid gas components. Moreover, gasifier 208 also produces a hot slag stream (not shown) as a by-product of the syngas production. The slag stream is channeled to a slag handling unit 215 via a hot slag conduit 216. Unit 215 quenches and breaks up the slag into small slag pieces wherein a slag removal stream is produced and channeled through conduit 217.

Referring to FIG. 1, gasifier 208 is coupled in flow communication with radiant syngas cooler (RSC) 144 via a hot syngas conduit 218. RSC 144 receives the hot, raw syngas stream and transfers at least a portion of the heat to heat recovery steam generator (HRSG) 142 via conduit 146. Subsequently, RSC 144 produces a cooled raw syngas stream (not shown) that is channeled to convective syngas cooler (CSC) 260 via a syngas conduit 219. CSC 260 further cools the raw syngas stream.

Referring again to both FIGS. 1 and 2, the cooled raw syngas stream is then channeled to a syngas scrubber (shown in FIG. 2 generally at 270) and low temperature gas cooling (LTGC) unit 221 via a syngas conduit 220. Unit 221 removes particulate matter entrained within the raw syngas stream and facilitates the removal of the removed matter via a fly ash conduit 222. Unit 221 also provides additional cooling to the raw syngas stream. Moreover, unit 221 converts at least a portion of COS in the raw syngas stream to $H_2S$ and $CO_2$ via hydrolysis.

System 200 also includes a separation device 250 that is coupled in flow communication with unit 221 and that receives the cooled raw syngas stream via a raw syngas conduit 225. Device 250 facilitates removing at least a portion of acid components (not shown) from the raw syngas stream as discussed in more detail below. Such acid gas components include, but are not limited to, $CO_2$, COS, and $H_2S$. Moreover, in one aspect, device 250 is coupled in flow communication with a sulfur reduction subsystem 275 via a conduit 223. Subsystem 275 also receives and facilitates the separation of at least some of the acid gas components into components that include, but are not limited to, $CO_2$, COS, and $H_2S$. The separation and removal of such $CO_2$, COS, and $H_2S$ via device 250 and subsystem 275 facilitates the production of a clean syngas stream (not shown) that is channeled to gas turbine 114 via a clean syngas conduit 228.

Referring to both FIGS. 1 and 2, device 250 channels a $CO_2$-rich gas stream to gasifier 208 via a $CO_2$-rich gas stream conduit 224. As used herein, "carbon dioxide-rich gas" or "$CO_2$-rich gas" refers to a gas stream having over 50% (by weight) carbon dioxide. In one aspect, a final integrated acid-rich gas stream (not shown) includes the $CO_2$-rich gas stream and also includes predetermined concentrations of COS, and $H_2S$ (not shown), which have been further separated from the raw syngas stream by sulfur reduction subsystem 275 as described above, and optionally, tail gas treatment unit (TGU) 277. In some embodiments, as shown in FIG. 2, after separating COS and $H_2S$, the stream containing COS and $H_2S$ is compressed via compressor 300 prior to being mixed with the $CO_2$-rich gas stream and channeled to gasifier 208 via $CO_2$-rich gas stream conduit 224.

Separation device 250 removes from about 15% (by total moles carbon dioxide present in syngas) to about 50% (by total moles carbon dioxide present in syngas) carbon dioxide-rich gas from the syngas. As noted above, the $CO_2$ is channeled as $CO_2$-rich gas stream (also referred to herein as "recycled $CO_2$-rich gas stream") or with COS and $H_2S$ as final integrated acid-rich gas stream to gasifier 208.

Separation device 250 is coupled in flow communication with gasifier 208 via conduit 224 wherein the recycled $CO_2$-rich gas stream is channeled in predetermined portions to gasifier 208. As further shown in FIG. 2, $CO_2$-rich gas from device 250 is compressed via $CO_2$ compressor 302 and is heated via $CO_2$ heater 304 when channeled via conduit 224.

In operation, in one embodiment, $O_2$ and feedstock, via conduits 210 and 214, respectively, may be mixed with $CO_2$-rich gas, via conduits 224 and 402, that has been compressed in compressor 302 and that may or may not have been heated in heater 304. The resulting feedstock mixture is fed to inlets 306a, 306b, and 306c of gasifier 208, wherein gasification occurs, in accordance with conventional procedures, to produce syngas.

It has been found that by compressing and/or heating the $CO_2$-rich gas prior to feeding a portion into a gasifier, an increased carbon conversion during gasification in gasification system 200 and subsequent processes in IGCC plant 100 is facilitated. In one embodiment, the methods of the present invention can increase carbon conversion by up to about 3% as compared to conventional gasification systems. The increased carbon conversion facilitates improving the efficiency of IGCC plant 100. More particularly, by increasing the carbon conversion in gasifier 208, an increased concentration of carbon monoxide (CO) is produced via the Boudouard reaction:

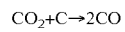

and the reverse water gas shift reaction:

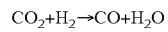

By increasing carbon monoxide production, a reduced oxygen consumption during gasification is facilitated, which further facilitates increasing IGCC plant 100 efficiency. Specifically, when the $CO_2$-rich gas is compressed, less oxygen is required during gasification as CO produced in the Boudouard and reverse water gas shift reactions provides an oxygen source. In one embodiment, the methods of the present invention can reduce oxygen consumption by up to about 2% per unit of syngas production (i.e., hydrogen and CO production) as compared to conventional gasification systems.

The $CO_2$-rich gas separated from the syngas mixture in a separation device 250 is typically compressed to a pressure in the range of from about 50 pounds per square inch to about 300 pounds per square inch above the pressure in gasifier 208 of a conventional IGCC plant 100. The gasifier pressure typically ranges from about 400 pounds per square inch to about 900 pounds per square inch.

In another aspect, if the $CO_2$-rich gas is heated, less $O_2$ is required during gasification to heat the syngas. Specifically, heated $CO_2$-rich gas is already being added to the syngas, and thus the temperature need not be raised to the extent of conventional gasification to produce the desired hot raw syngas. As such, a more efficient IGCC gasification process is facilitated.

Compressed $CO_2$-rich gas typically has a temperature ranging from about 200° F. (93.3° C.) to about 300° F. (148.9° C.). When heated, the compressed $CO_2$-rich gas is typically heated to a temperature of from about 550° F. (278.8° C.) to about 700° F. (371.1° C.). For example, in one aspect, the compressed $CO_2$-rich gas is heated to a temperature of about 650° F. (343.3° C.).

In addition to reduced oxygen consumption, a higher carbon conversion (produced when $CO_2$-rich gas is compressed and/or heated) can lead to a reduced hydrogen consumption via the reverse water gas shift reaction described above. In particular, CO has a lower heating value as compared to $H_2$.

Accordingly, by substituting CO for $H_2$ in the gasification process, improved efficiency results.

Syngas produced in gasifier 208 exits the gasifier 208 at outlet 310. As described generally above, the hot raw syngas is channeled to RSC 144 and CSC 260 wherein the syngas is cooled and is then channeled to syngas scrubber 270, LTGC unit 221 and, finally, to separation device 250.

In one aspect, the hot raw syngas may be cooled prior to being introduced into RSC 144 by mixing the hot raw syngas mixture at addition point 312 with a portion of compressed and/or heated carbon dioxide-rich gas separated by separation device 250 via conduit 404 to form a combined syngas mixture. The combined syngas mixture may then be introduced into RSC 144 via inlet 314 where it is cooled.

It has been found that by mixing the hot raw syngas produced in gasifier 208 with a portion of compressed and/or heated $CO_2$-rich gas, IGCC plant 100 can further be run more efficiently. Specifically, as described above, the compressed and/or heated $CO_2$-rich gas increases carbon conversion via the reverse water gas shift reaction, thereby reducing the hydrogen consumption. Because CO has a lower heating value as compared to $H_2$, CO is also capable of being cooled more efficiently as compared to $H_2$, thus resulting in a lower cost and higher efficiency IGCC plant 100.

Additionally, in some plants, the separation systems further include soot blowing in radiant syngas cooler 144 to blow off deposits of ash and slag on the tubes of cooler 144. Conventionally, nitrogen ($N_2$) is used for the soot blowing. With the present methods, however, $CO_2$ can be used in place of $N_2$ for soot blowing to provide further advantages. Specifically, as $CO_2$ is denser than $N_2$, less $CO_2$ is required for soot blowing. Furthermore, it has been found that $CO_2$ is easier to separate from the syngas as compared to $N_2$.

Cooled syngas exits RSC 144 at outlet 318 and may be channeled to CSC 260 for further cooling. Particularly, in one embodiment, the syngas is further cooled to a temperature of about 900° F. (482.2° C.) to about 1600° F. (871.1° C.), and more particularly, to a temperature of about 1300° F. (704.4° C.). Once cooled, the syngas may be introduced into syngas scrubber 270 and LTGC unit 221 for removal of particulate matter entrained within the raw syngas stream and then introduced into separation device 250 to facilitate separation of at least some of the acid gas components into components that include, but are not limited to, $CO_2$, COS, and $H_2S$.

In one aspect, the cooled syngas exits RSC 144 and is mixed at addition point 320 with a portion of compressed carbon dioxide-rich gas, separated by separation device 250 to form a combined syngas mixture. Typically, if compressed $CO_2$-rich gas is added at addition point 320, the $CO_2$-rich gas is not heated in $CO_2$ heater 304. As the compressed $CO_2$-rich gas is not heated, it can allow for further cooling of the cooled syngas.

Once mixed, the combined syngas mixture is fed to inlet 322 of convective syngas cooler (CSC) 260 where it is subjected to further cooling. Cooled syngas exiting the CSC 260 at outlet 326 is typically at a temperature in the region of from about 400° F. (204.4° C.) to about 800° F. (426.7° C.). The cooled syngas is then fed to syngas scrubber 270, LTGC unit 221 and separation device 250.

While described herein as conducting consecutive addition points of compressed and/or heated $CO_2$-rich gas into the syngas mixtures of gasification system 200, it should be recognized that the compressed $CO_2$-rich gas may be added at only one or two of the addition points described above without departing from the scope of the present invention. For example, in one aspect, syngas is first produced with only $O_2$ and feedstock in gasifier 208 (i.e., without the addition of compressed and/or heated $CO_2$-rich gas) and the syngas mixture can then be mixed with a first portion of compressed and/or heated $CO_2$-rich gas at addition point 312 and cooled in RSC 144. In another aspect, syngas is produced from $O_2$ and feedstock and cooled in RSC 144. Once the cooled syngas exits RSC 144 at outlet 318, the cooled syngas can be mixed with a first portion of compressed and/or heated $CO_2$-rich gas at addition point 320 and further cooled in CSC 260.

One additional advantage of using the methods of the present invention includes not requiring the inclusion of sulfur removal subsystem 275 in IGCC plant 100. In particular, as the compressed and/or heated carbon dioxide-rich gas is removed from separation device 250 and mixed again with syngas, the $CO_2$-rich gas does not have to be purified to remove sulfur. As a result, separation device 250 can be optimized to allow the $CO_2$-rich gas to contain sulfur.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recycling carbon dioxide from a first syngas mixture of a gasification system, said method comprising:

removing carbon dioxide-rich gas from the first syngas mixture in a separation device;

compressing the carbon dioxide-rich gas;

heating the compressed carbon dioxide-rich gas to a temperature of between about 550° F. (278.8° C.) to about 700° F. (371.1° C.); and feeding at least a first portion of the compressed carbon dioxide-rich gas to a gasifier.

2. The method as set forth in claim 1, wherein upon gasification, a second syngas mixture is produced, said method further comprises cooling the second syngas mixture in a radiant syngas cooler.

3. The method as set forth in claim 2 further comprising supplying the cooled second syngas mixture to a syngas scrubber.

4. The method as set forth in claim 3 further comprising:

cooling the scrubbed syngas mixture discharged from the syngas scrubber; and channeling the cooled scrubbed syngas mixture to the separation device.

5. The method as set forth in claim 2 further comprising contacting the second syngas mixture with a second portion of compressed carbon dioxide-rich gas in the radiant syngas cooler to facilitate cooling the second syngas mixture.

6. The method as set forth in claim 5 further comprising:

contacting the cooled second syngas mixture with a third portion of compressed carbon dioxide-rich gas to form a mixture; and channeling the mixture to a convective syngas cooler.

7. The method as set forth in claim 1, wherein said removing carbon dioxide-rich gas from the first syngas mixture in a separation device comprises removing from about 15% (by total moles carbon dioxide present in the first syngas mixture) to about 50% (by total moles carbon dioxide present in the first syngas mixture) carbon dioxide-rich gas.

8. The method as set forth in claim 1, wherein said feeding the first portion of compressed carbon dioxide-rich gas facilitates increasing carbon conversion by up to about 3%.

9. The method as set forth in claim 1, wherein said feeding the first portion of compressed carbon dioxide-rich gas facilitates reducing oxygen consumption per unit of syngas production by up to about 2%.

10. The method as set forth in claim 1, wherein the first portion of the compressed carbon dioxide-rich gas is combined with at least one of oxygen and feedstock to form a feedstock mixture.

* * * * *